UNITED STATES PATENT OFFICE.

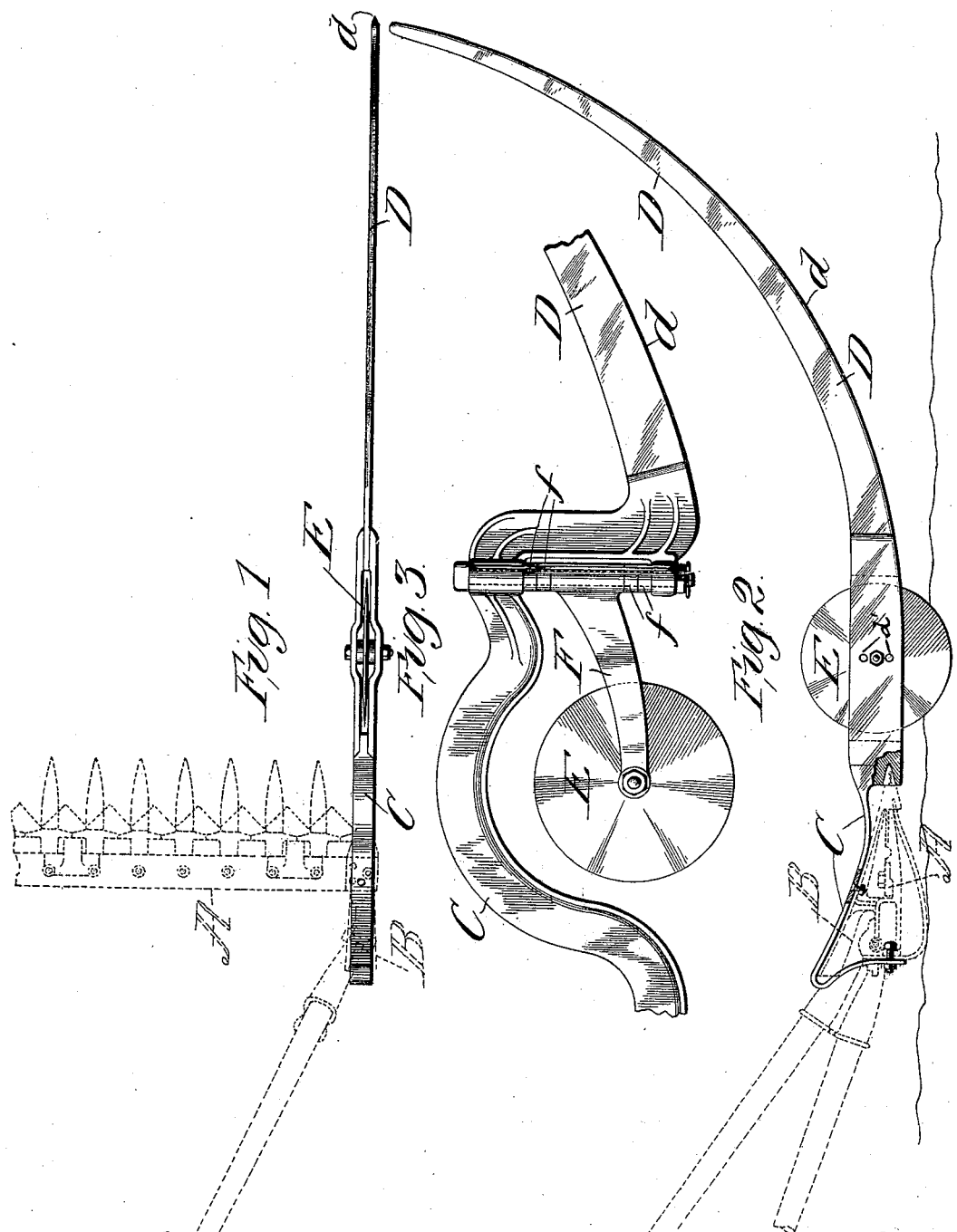

WILLIS HORD, OF JENNINGS, MISSOURI.

ATTACHMENT FOR MOWING-MACHINES.

SPECIFICATION forming part of Letters Patent No. 651,626, dated June 12, 1900.

Application filed September 18, 1899. Serial No. 730,833. (No model.)

*To all whom it may concern:*

Be it known that I, WILLIS HORD, a citizen of the United States, residing at Jennings, in the county of St. Louis and State of Missouri, have made a certain new and useful Improvement in Attachments to Mowing-Machines, of which the following is a full, clear, and exact description, such as will enable others skilled in the art to which it appertains to make and use the same, reference being had to the accompanying drawings, forming part of this specification, in which—

Figure 1 is a top plan view of my attachment to mowing-machines, showing the outer end of the cutter-bar in dotted lines. Fig. 2 is an end elevational view showing the cutter-bar in dotted lines and my attachment in position thereon, and Fig. 3 is a detail view of the trailing cutter used in connection with my attachment.

This invention relates to a new and useful improvement in attachments to mowing-machines, the object being to provide means on the cutter-bar of a mowing-machine for forcing heavy growth, and especially climbing vines, such as cow-pea and clover hay, down to the action of a rotary knife or cutter acting vertically to define the path of the knife-bar and also enable the cut growth to be handled.

With this object in view my invention consists in attaching to the finger-bar of a mowing-machine a forwardly-extending presser-bar, which presser-bar is provided with a knife-edge on its under edge, whereby when the machine is being drawn through a field said knife-edge will cut, break, or bend the growth to be mowed preparatory to the severing action of a rotary cutter or knife which is in line therewith and which travels upon the ground. This rotary cutter or knife is mounted at or near the lower inner end of the presser-bar and acts at right angles to the reciprocating knife-bar of the machine, said rotary cutter traveling upon the ground, so as to vertically sever the growth in its path.

Other features of invention reside in the novel construction, arrangement, and combination of the several parts of my device, all as will hereinafter be described and afterward pointed out in the claims.

In the drawings, A indicates the finger-bar of an ordinary mowing-machine carrying the usual finger-guards and knife-bar, one end of which finger-bar is provided with the usual shoe B.

C indicates my attachment, which, as shown in the drawings, is secured by suitable bolts to the shoe B; but it is obvious that my attachment can be secured in any desired manner to the machine.

D indicates the presser-bar, extending forwardly and curving upwardly, as shown in Fig. 1, and is sharp or knife-like on its lower edge, as at $d$, the function of which is to partially sever, break, or bend the growth and force the same down to the action of a knife E, here shown as a rotary cutter received in a slot in the presser-bar, which is designed to roll over the ground and sever the growth in its path at right angles to the line of cut of the usual knife-bar. This rotary cutter may be adjusted with respect to the presser-bar D by changing the position of the bolt forming the axle thereof by placing said bolt in one of the series of vertical openings $d'$ provided therefor. In Fig. 3 I have shown this rotary cutter as being mounted in a pivoted frame F, said frame being adjustable relative to the presser-bar by changing the washers $f$ on the pivot-bolt above and below said frame.

By the use of an ordinary mowing-machine it is difficult to harvest cow-pea vines and clover hay for the reason that the growth is so tangled—the vines running in all directions and entwining each other—that when the ordinary cutter-bar severs the vines near the ground the growth is so matted that it practically stands up as before, no line of cut being indicated, and even should it be attempted to remove the cut vines manually the entanglement of the growth would render it exceedingly difficult. By the use of my attachment the upper end of the forerunning presser-bar is sufficiently high to pass over the tops of the vines and by gradually depressing them force the vines under the knife or cutter E, which, working at right angles to the reciprocating knife-bar, practically takes out a slice and leaves a well-defined clear path for the mowing-machine on its next round. By the use of a vertically-acting knife the vines are much easier handled, because those vines which trail transversely the path of the machine are cut in sections.

I am aware that minor changes in the construction, arrangement, and combination of the several parts of my attachment can be made and substituted for those herein shown and described without in the least departing from the nature and principle of my invention.

Having thus described my invention, what I claim, and desire to secure by Letters Patent, is—

1. The herein-described attachment to mowing-machines, comprising the combination with a finger-bar, of a forwardly and upwardly extending presser-bar, and a knife or cutter arranged at or near the lower, inner end of said presser-bar and designed to travel on the ground for severing the growth at an angle to the cut of the ordinary knife-bar; substantially as described.

2. The combination with the finger-bar of a mowing-machine, of a forwardly and upwardly curved presser-bar secured to the outer end thereof, a rotary cutter mounted on said bar and projecting below the plane thereof, so as to bear on the ground and sever all the growth therebetween on the ground, and means for adjusting said rotary cutter relative to said bar; substantially as described.

3. The combination with the finger-bar of a mowing-machine, of a forwardly and upwardly curved presser-bar secured to the end thereof, said presser-bar being formed sharp or knife-like on its lower edge, a rotary cutter mounted on said bar, and so arranged as to rest on the ground, and means for adjusting said rotary cutter relative to said bar; substantially as described.

4. The combination with the finger-bar of a mowing-machine, of a forwardly and upwardly curved presser-bar, secured to the outer end thereof, a frame pivoted to said presser-bar, and a rotary cutter mounted in the free end of said frame; substantially as described.

In testimony whereof I hereunto affix my signature, in the presence of two witnesses, this 13th day of September, 1899.

WILLIS HORD.

Witnesses:
  WM. H. SCOTT,
  RALPH KALISH.